Inventors
Roy Essam
Arthur Stephen Walsh
Kenneth Brian Whiting
By [signature] Attorneys July 30, 1963 R. ESSAM ET AL 3,099,794

NON-RECIPROCAL COUPLING ARRANGEMENTS FOR RADIO FREQUENCY SIGNALS

Filed March 1, 1960 2 Sheets-Sheet 2

Inventors
Roy Essam
Arthur Stephen Walsh
Kenneth Brian Whiting
By [signature]
Attorneys 3,099,794

NON-RECIPROCAL COUPLING ARRANGEMENTS FOR RADIO FREQUENCY SIGNALS

Roy Essam, Stanmore, Arthur Stephen Walsh, Watford, and Kenneth Brian Whiting, London, England, assignors to The General Electric Company Limited, London, England, a British company Filed Mar. 1, 1960, Ser. No. 12,496

Claims priority, application Great Britain Mar. 11, 1959

9 Claims. (Cl. 325—24)

Figure 1:
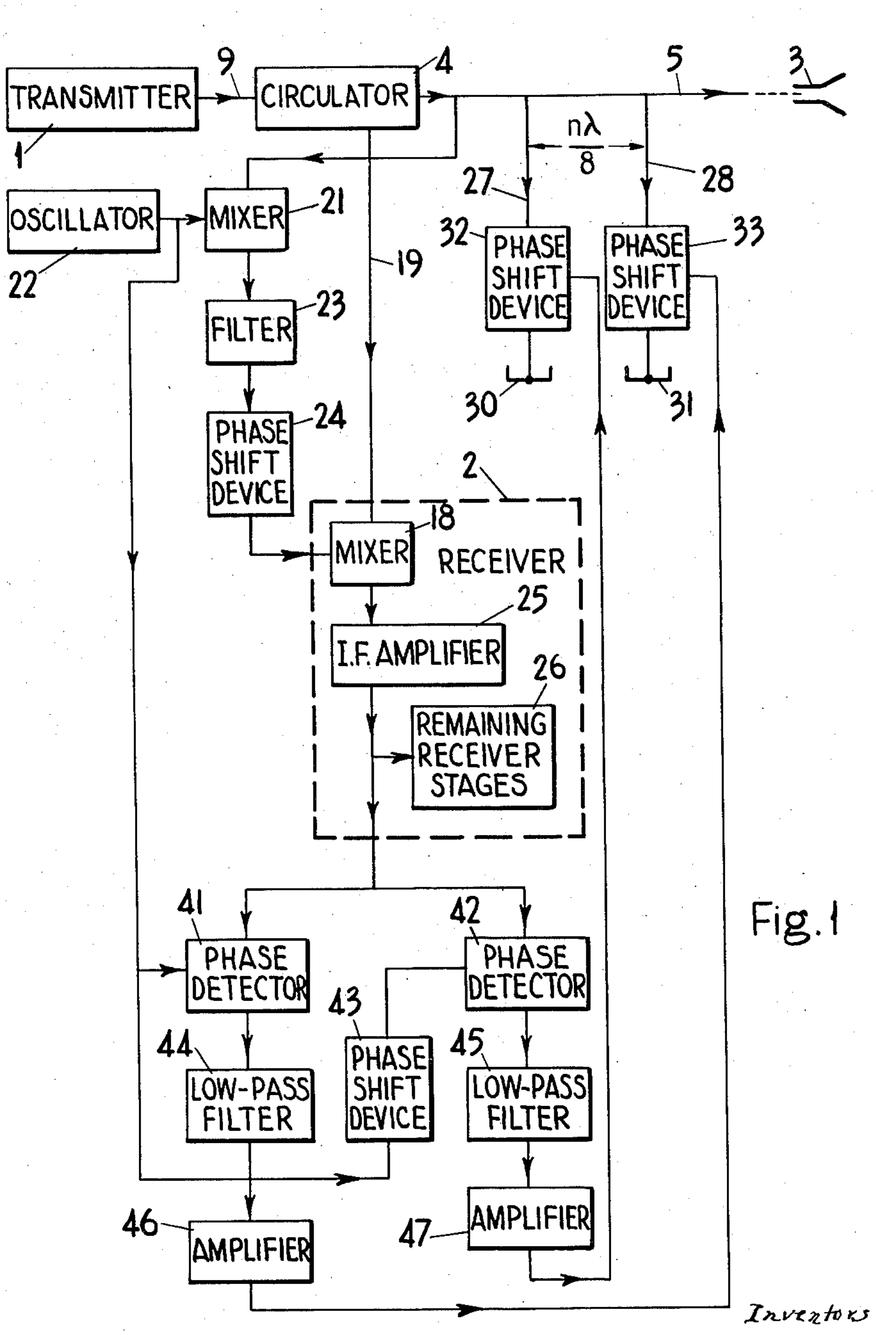

This invention relates to non-reciprocal coupling arrangements for radio frequency signals.

More particularly, but not exclusively, the invention is concerned with radio duplexing apparatus, that is to say apparatus which enables an aerial system to be coupled to both a radio transmitter and a radio receiver but at the same time prevents excessive energy supplied by the transmitter being fed directly to the receiver. The kind of radio duplexing apparatus to which the invention may be applied is that adapted for use in a continuous wave radio system which may for example be a continuous wave radar system.

According to the present invention, a non-reciprocal coupling arrangement for radio frequency signals comprises first, second and third paths for radio frequency signals, a circulator which is connected to said first, second and third paths and which is arranged to pass signals supplied thereto over the first and second paths mainly to the second and third paths respectively, and means automatically to cause a variable portion of the signal supplied to the second path by the circulator to be reflected back over that path in dependence upon the portion of the signal supplied over said first path that breaks through to the third path so as to reduce the amplitude of the breakthrough signal on the third path.

A known construction of circulator to provide coupling between three paths in the manner stated is sometimes referred to as a three-arm or three-port circulator and may in fact be derived from the more commonly known four-arm circulator as mentioned in an article entitled "Ferrite Components in Microwave Systems" commencing on page 341 of "Electronic Engineering," May 1958, with particular reference to page 342. A three-arm circulator is also described in an article entitled "Waveguide Components with Non-reciprocal Properties" which commences on page 376 of "Electronic Engineering," September 1956, with particular reference to page 379.

In practice it is found that there is always some "breakthrough" coupling between the paths between which the circulator is required not to provide coupling. Such breakthrough coupling is due partly to the circulator not being ideal and partly to the effect of the non-reciprocal properties of the circulator on the portion of any signal passed by the circulator which is reflected back to the circulator. In order to appreciate the latter effect, it is convenient to consider a non-reciprocal arrangement in accordance with the present invention if the said means were not to be provided; assuming also that the second path is not correctly terminated, a portion of any signal fed from the first path to the second path by the circulator would be reflected back from the termination to the circulator and would therefore be passed to the third path so that there would effectively be some "breakthrough" coupling between the first and third paths.

The circulator may be of the kind depending for its operation on the Faraday rotation effect but it is to be understood that the present invention is not restricted to this kind of circulator but is equally applicable to any circulator which provides non-reciprocal coupling between three paths in the manner stated.

Preferably the said means comprises two stub transmission lines (for example waveguides) which are connected to the second path at points spaced along that path and means to tune the two stub lines in dependence upon the said breakthrough signal on the third path. The two stub lines may be spaced an odd number of one-eighth wavelengths apart along the second path and the means to tune the two stub lines may be arranged to tune the two lines separately in dependence upon the amplitude of two components respectively of the breakthrough signal on the third path, these two components being in phase quadrature. For the purpose of tuning each stub line, it may include a variable phase-shift device which is arranged to vary the effective length of the stub line. Each of these phase-shift devices may be of the kind comprising a ferrite or like ferrogmagnetic ceramic member within a waveguide and means to provide a steady magnetic field in which the ferrite or like member lies, the phase-shift effected by the device being controlled by varying the steady magnetic field.

According to a feature of the present invention, radio duplexing apparatus for use in a continuous wave radio system comprises a first path over which, during operation, is supplied a radio frequency signal supplied by a source of such signals (for example a radio transmitter), a second path which constitutes an aerial feeder, a third path over which, during operation, is supplied a radio frequency signal to a suitable utilisation device (for example a radio receiver), a circulator which is connected to said first, second and third paths and which is arranged to pass signals supplied thereto over the first and second paths mainly to the second and third paths respectively, and means automatically to cause a variable portion of the signal supplied to the second path by the circulator to be reflected back over that path in dependence upon the portion of the signal supplied over said first path that breaks through to the third path so as to reduce the amplitude of the breakthrough signal on the third path.

Clearly breakthrough coupling is most undesirable in duplexing apparatus since, when the apparatus is connected to a transmitter and a receiver, it would cause excessive energy to be supplied directly from the transmitter to the receiver. Duplexing apparatus in accordance with the present invention automatically reduces the effect of such breakthrough.

Figure 2:
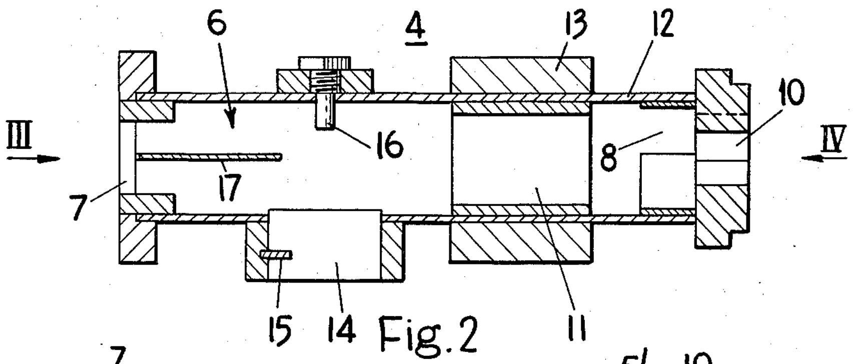
Figure 3:
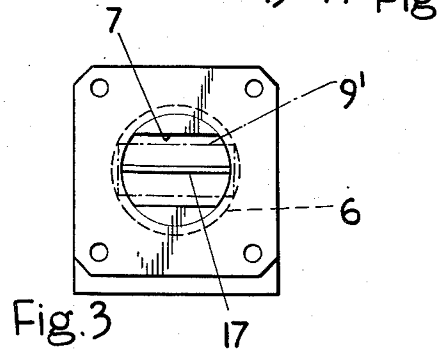
Figure 4:
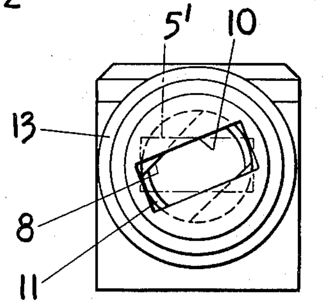
Figure 5:
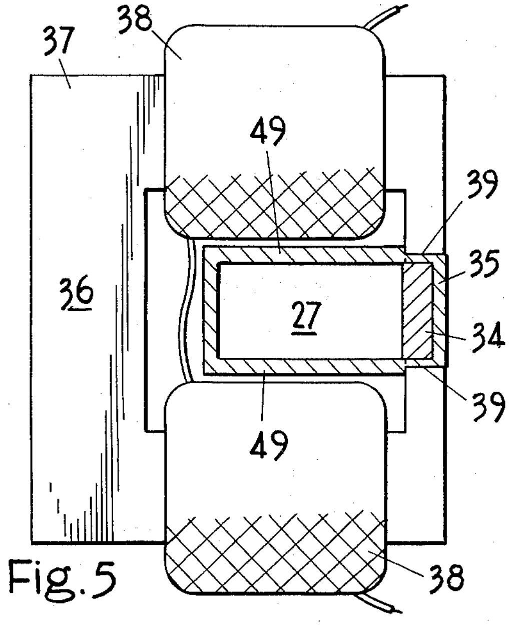
Figure 6:
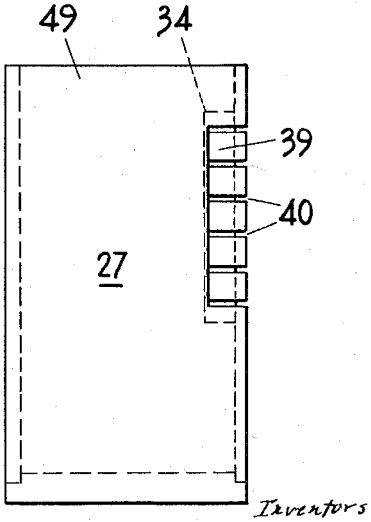

One example of duplexing apparatus for a continuous wave radar system will now be described with reference to the accompanying drawings in which:

FIGURE 1 shows the apparatus diagrammatically,

FIGURES 2, 3 and 4 show part of the apparatus in more detail, FIGURE 2 being a cross-section through this part and FIGURES 3 and 4 being end elevations in the directions of the arrows III and IV respectively in FIGURE 2, and FIGURES 5 and 6 show in detail sectional elevation and plan views respectively of another part of the apparatus.

The radar system of which the duplexing apparatus now to be described forms part is arranged to operate at a frequency of about 10,000 megacycles per second and, referring now to FIGURE 1 of the accompanying drawings, comprises a radar transmitter 1, a radar receiver 2 which are arranged to be coupled to an aerial system 3 by way of a circulator 4 and an aerial feeder 5. The circulator 4 is arranged, at least theoretically, to pass to the feeder 5 any signal supplied thereto by the transmitter 1 while any signal supplied to the circulator 4 over the feeder 5 is passed to the receiver 2.

The construction of the circulator 4 is shown in more detail in FIGURES 2, 3 and 4 of the accompanying drawings and, referring now to those figures, the circulator comprises a waveguide 6 of circular cross-section. At the ends of the waveguide 6 there are transition sections 7 and 8 for converting from a waveguide of circular cross-section to a waveguide of rectangular cross-section while adjacent to the section 8 there is a further transition section 10 which has a stepped twist. The waveguide 6 with its transition sections 7, 8 and 10 is connected between a waveguide 9 (FIGURE 1) and a waveguide forming the aerial feeder 5, both the waveguides 5 and 9 being of rectangular cross-section. The internal outlines of the ends of the waveguides 5 and 9 where they butt against the waveguide sections 10 and 7 are shown in FIGURES 4 and 3 respectively by broken lines 5' and 9'.

A tube 11 of magnesium manganese ferrite is provided within the waveguide 6 and is so dimensioned that it is in contact with the waveguide wall 12 so as to assist cooling the tube 11 during operation of the apparatus. The portion of the waveguide 6 in which the tube 11 lies is embraced by an annular permanent magnet 13 which provides a magnetic field extending longitudinally within the waveguide 6 in the region of the tube 11. Another waveguide 14 of rectangular cross-section opens into the waveguide 6, the longitudinal axis of this waveguide 14 being at right angles to that of the waveguide 6.

The circulator is arranged in known manner so that the ferrite tube 11 causes any signal being passed in either direction along the waveguide 6 to be subjected to a Faraday rotation of 45° and the arrangement is such that any signal supplied to the circulator by the transmitter 1 is passed mainly to the aerial feeder 5 with only a small portion thereof reaching the waveguide 14 to which the receiver 2 is connected while any signal supplied to the circulator over the aerial feeder 5 is passed mainly to the receiver 2. For the purpose of matching the waveguide 14 to the waveguide 6, the waveguide 14 is provided with an iris 15 and a tuning screw 16 projects into the waveguide 6 opposite the waveguide 14. Furthermore, the waveguide 6 contains a septum plate 17 which presents a short circuit across the waveguide 6 as far as signals passed thereto from the aerial feeder 5 are concerned but permits the passage of signals supplied by the transmitter 1 due to the different planes of polarisation of these signals.

Turning again to FIGURE 1, the radar receiver 2 comprises a balanced mixer 18 which is arranged to derive the intermediate frequency of the receiver by heterodyning locally generated oscillations with the signal supplied by the circulator 4 over a waveguide 19, this waveguide 19 being connected to the waveguide 14 (FIGURE 2). A further balanced mixer 21 is arranged to supply the locally generated oscillations by heterodyning together a portion of the signal supplied by the circulator 4 to the aerial feeder 5 with oscillations supplied by a local oscillator 22, the frequency of this oscillator being equal to the intermediate frequency of the receiver 2. A filter 23 is arranged to select the upper side band produced by the mixer 21 and the oscillations passed by the filter 23 are fed to the mixer 18 by way of a phase shift device 24.

The intermediate frequency signal supplied by the mixer 18 is passed through an amplifier 25 to the remaining stages of the radar remaining receiver 2 which is shown diagrammatically in FIGURE 1 by a rectangle 26.

As so far described, the duplexing apparatus would result in appreciable energy being supplied directly from the transmitter 1 to the receiver 2 as a result of breakthrough in the circulator 4. In order to reduce the effect of this breakthrough, a portion of the signal supplied by the circulator 4 to the aerial feeder 5 is deliberately reflected back over that feeder to the circulator and is, therefore, passed to the receiver 2 by way of the waveguide 19. The amplitude and phase of this reflected portion of the transmitted signal is so arranged that it tends to cancel the breakthrough signal on the waveguide 19. For this purpose there are provided two variable impedance discontinuities in the aerial feeder 5, these discontinuities taking the form of tunable waveguide stubs 27 and 28.

The two like waveguide stubs 27 and 28 are spaced an odd number of eighth wavelengths apart along the aerial feeder 5 and the ends of these stubs remote from the feeder 5 are provided with short circuits 30 and 31. The waveguide stubs 27 and 28 contain variable phase shift devices 32 nd 33 which are arranged, in a manner hereinafter to be described, effectively to vary the lengths of the stubs.

The construction of the waveguide stub 27, for example, will now be considered with reference to FIGURES 5 and 6 of the accompanying drawings. A slab 34 of magnesium manganese ferrite material is glued to one of the narrow walls 35 of the waveguide 27 and an electromagnet 36 (which is omitted from FIGURE 6 to show details of the waveguide 27) is associated with this slab 34 to provide the phase shift device 32 (FIGURE 1).

A phase shift device of this general kind is described in an article entitled, "Behaviour and Applications of Ferrites in the Microwave Region," by A. G. Fox, S. E. Miller and M. T. Weiss in volume 34 of the Bell System Technical Journal, pages 76 to 79 being particularly relevant.

In the present phase shift device, the electromagnet 36 comprises a ferro-magnetic core 37 which is embraced by two series-connected coils 38. The portions 39 of the waveguide wall adjacent the pole faces of the electromagnet 36 are of reduced thickness so as to reduce the reluctance of the magnetic circuit. During using of the apparatus the phase shift introduced by the device 32 may be required to change fairly rapidly and, so that the walls of the waveguide 27 do not constitute a short-circuited turn embracing the magnetic flux due to the electromagnet 36, slots 40 are provided in the wall 35 and the adjacent walls 49.

Referring again to FIGURE 1 of the accompanying drawings, the electric signals supplied to the coils 38 of the two electromagnets 36 associated with the two phase-shift devices 32 and 33 are derived from the intermediate frequency signal supplied by the amplifier 25. For this purpose the intermediate frequency signal, is fed to two phase detectors 41 and 42. These two phase detectors 41 and 42 are arranged to compare the phase of the intermediate frequency signal with the oscillations supplied by the local oscillator 22 although in the case of the detector 42 the oscillations supplied by the local oscillator are first passed through a device 43 to introduce a phase shift of 90°. The two phase detectors 41 and 42 thus supply signals that are a measure of the amplitudes of two components of the breakthrough signal on the waveguide 19 that are in phase quadrature. These two signals are each passed through a low-pass filter 44 or 45 having a cut-off frequency of about 2 kilocycles per second and are then amplified by means of an amplifier 46 or 47 to provide two steady signals which are utilised to energise the coils 38 of the two electromagnets 36 associated with the two stub waveguides 27 and 28 respectively.

The phase shift introducd by the device 24 is chosen so that the signals supplied by the amplifiers 46 and 47 cause the waveguide stubs 27 and 28 to present the desired impedances to the aerial feeder 5. These impedances result in two portions of the signal supplied by the circulator 4 to the feeder 5 being reflected back to the circulator, these two portions being in phase quadrature and together substantially cancelling the breakthrough signal which would otherwise be present on the waveguide 19.

During operation of the radar system of which the duplexer forms part, the aerial system 3 is caused to move for the purpose of scanning. The impedance presented by the aerial system 3 is found to vary somewhat during scanning with the result that a variable portion of the signal supplied by the transmitter 1 to the feeder 5 is reflected back to the circulator 4. It will be appreciated that the arrangement described above serves automatically to compensate for this and ensures that the amplitude of the breakthrough signal on the waveguide 19 is always small.

During operation of the radar system under consideration, waves transmitted by the aerial system 3 are reflected back by any moving object with a slight change of frequency due to the Doppler effect. Such a frequency shift is detected in known manner by the stages 26 of the receiver 2.

Although in the apparatus described above the locally generated oscillations fed to the mixer 18 are derived from a portion of the signal to be radiated, the said locally generated oscillations may be supplied by a separate source of radio frequency oscillations, for example a klystron. It is, however, then necessary for the effect of any phase variation of these oscillations to be compensated for since otherwise the signals supplied by two phase detectors 41 and 42 would not correctly represent the amplitudes of the two components of the breakthrough signal as aforesaid. This compensation may be effected by feeding the oscillations supplied by the said klystron or other source, which may be provided with its own automatic frequency control system, to the mixer 18 and also to the mixer 21 which thus in this case serves again to heterodyne a portion of the signal supplied by the transmitter 1 with the locally generated oscillations. If a signal passed over the aerial feeder 5 to the circulator 4 has a frequency $f_s$, the transmitter frequency is $f_t$ and the frequency of the locally generated oscillations is $f_g$, the signals passed by these two mixers 18 and 21 have frequencies of $f_g - f_s$ and $f_g - f_t$ respectively. The signal having the latter frequency is amplified and then passed to another mixer where it is heterodyned with oscillations supplied by the local oscillator 22 which, as previously, provides the reference oscillations to the two phase detectors 41 and 42. If the frequency of this local oscillation is $f_o$, the resulting signal has a frequency $f_g - f_t - f_o$. The signals of frequencies $f_g - f_s$ and $f_g - f_t - f_o$ are separately amplified and passed to yet another mixer which derives therefrom a signal of frequency $f_o - (f_s - f_t)$. This latter signal which is independent of the frequency $f_g$ of the locally generated oscillations supplied to the mixer 18 is amplified and passed both to the remaining stages 26 of the receiver 2 and to the two phase detectors 41 and 42 where it is compared with the reference oscillations of frequency $f_o$ for the purpose of deriving the signals which are utilised to energise the two electromagnets 36 as aforesaid.

We claim:

1. A non-reciprocal coupling arrangement for radio frequency signals comprising first, second and third paths for radio frequency signals, a non-reciprocal circulator which is connected to said first, second and third paths and which is arranged to pass signals supplied thereto over the first and second paths mainly to the second and third paths respectively, variable impedance means connected to the second path so as to present a variable impedance to that path, and means automatically to control the variable impedance means in dependence upon the portion of the signal supplied over said first path that breaks through to the third path so as to cause a variable portion of the signal supplied to the second path by the circulator to be reflected back over that path and thereby reduce the amplitude of the breakthrough signal on the third path.

2. A non-reciprocal coupling arrangement for radio frequency signals comprising first, second and third paths for radio frequency signals, a non-reciprocal circulator which is connected to said first, second and third paths and which is arranged to pass signals supplied thereto over the first and second paths mainly to the second and third paths respectively, two stub transmission lines which are connected to the second path at points spaced along that path, and means automatically to tune the two stub lines in dependence upon the portion of the signal supplied over said first path that breaks through to the third path so as to cause a variable portion of the signal supplied to the second path by the circulator to be reflected back over that path and thereby reduce the amplitude of the breakthrough signal on the third path.

3. A non-reciprocal coupling arrangement according to claim 2 wherein the circulator is of the kind dependent for its operation on the Faraday rotation effect.

4. A non-reciprocal coupling arrangement according to claim 2 wherein the two stub transmission lines are waveguides.

5. A non-reciprocal coupling arrangement according to claim 2 wherein the two stub lines are spaced an odd number of eighth wavelengths apart and the means to tune the two stub lines is arranged to tune the two lines separately in dependence upon the amplitude of two components respectively of the breakthrough signal on the third path, these two components being in phase quadrature.

6. A non-reciprocal coupling arrangement according to claim 2 wherein, for the purpose of tuning each stub line, it includes a variable phase shift device which is arranged to vary the effective length of the stub line.

7. A non-reciprocal coupling arrangement according to claim 6 wherein the two stub transmission lines are waveguides and said phase shift device in each of the stub waveguides is of the kind comprising a ferrite or like member within the waveguide and means to provide a steady magnetic field in which the ferrite or like member lies, the phase shift effected by the device being controlled by varying the steady magnetic field.

8. Radio duplexing apparatus for use in a continuous wave radio system comprising a first path over which, during operation, is supplied a radio frequency signal supplied by a source of such signals, a second path which constitutes an aeral feeder, a third path over which, during operation, is supplied a radio frequency signal to a suitable utilisation device, a non-reciprocal circulator which is connected to said first, second and third paths and which is arranged to pass signals supplied thereto over the first and second paths mainly to the second and third paths respectively, variable impedance means connected to the second path so as to present a variable impedance to that path, and means automatically to control the variable impedance means in dependence upon the portion of the signal supplied over said first path that breaks through to the third path so as to cause a variable portion of the signal supplied to the second path by the circulator to be reflected back over that path and thereby reduce the amplitude of the breakthrough signal on the third path.

9. Radio duplexing apparatus according to claim 8 wherein the source of radio frequency signal is a radio transmitter and the utilization device is a radio receiver.

References Cited in the file of this patent

UNITED STATES PATENTS

| | | |
|---|---|---|
| 2,485,606 | Kandoian | Oct. 25, 1949 |
| 2,760,057 | Johannesen | Aug. 21, 1956 |
| 2,789,210 | Arnold | Apr. 16, 1957 |
| 2,890,328 | Fox | June 9, 1959 |
| 2,934,638 | Mita et al. | Apr. 26, 1960 |
| 3,015,786 | Alford | Jan. 2, 1962 |
| 3,021,521 | Hutchins | Feb. 13, 1962 |